United States Patent [19]
Cann
[11] 3,929,967
[45] Dec. 30, 1975

[54] HIGH TEMPERATURE FLUE GAS TREATMENT

[75] Inventor: Everett Douglas Cann, Madison, Wis.

[73] Assignees: Everett Douglas Cann; William T. Neiman, both of Madison, Wis.

[22] Filed: Jan. 3, 1972

[21] Appl. No.: 214,960

[52] U.S. Cl. .................................. 423/242; 423/541
[51] Int. Cl.$^2$ ..................... C01B 17/00; C01B 17/50
[58] Field of Search ............................ 423/242–244, 423/541

[56] References Cited

UNITED STATES PATENTS

| | | | |
|---|---|---|---|
| 1,496,410 | 6/1924 | Doremus et al. | 423/242 X |
| 2,134,481 | 10/1938 | Jonnstone | 423/242 |
| 3,579,296 | 5/1971 | Cann | 423/242 |
| 3,607,036 | 9/1971 | Foecking et al. | 423/541 |
| 3,607,045 | 9/1971 | Wheelock et al. | 423/541 |
| R21,631 | 11/1940 | Johnstone | 423/243 |

OTHER PUBLICATIONS

Baxter, "Recent Electrostatic Precipitator Experience with Ammonia Conditioning of Power Boiler Flue Gases," J. Am. Poll. Control Assoc. Vol. 18, pp. 817–820.

*Primary Examiner*—Oscar R. Vertiz
*Assistant Examiner*—Gregory A. Heller
*Attorney, Agent, or Firm*—Wolfe, Hubbard, Leydig, Voit & Osann, Ltd.

[57] ABSTRACT

A method is provided for treating flue and like effluent gases at elevated temperature for removal of sulfur dioxide, sulfur trioxide, nitrogen oxides, smog-producing organics, and particulates. In the preferred embodiment, ammonia gas introduced at a temperature above 250° F in a proportion of from abot 0.2 to about 2.0 mols per mol of total sulfur oxides. The resulting ammonium salts of sulfur dioxide and trioxide and nitrogen oxides, organics, and particulates, are recovered, and may be treated with an alkaline earth metal oxide or zinc oxide to liberate the ammonia for recycle and to form sulfite, sulfate, nitrogen oxide salts which are decomposed under reducing conditions to liberate the alkaline earth metal or zinc oxide for recycle and the sulfur dioxide for use elsewhere.

1 Claim, 1 Drawing Figure

SOLIDS

HIGH TEMPERATURE FLUE GAS TREATMENT

FIELD OF INVENTION

This invention relates to the treatment of flue or other effluent gases containing sulfur dioxide and trioxide, and more particularly concerns the provision of a process operable at the conventional temperatures of flue gas treatment which effectively reduces or eliminates sulfur dioxide, sulfur trioxide, nitrogen oxides, smog-producing organics, and particulates.

BACKGROUND OF THE INVENTION

The combustion of sulfur-containing fossil fuels represents one of the most serious cases of atmospheric pollution. A typical medium sized hydrothermal steam plant of 500-megawatt capacity will burn some 5,000 tons of coal per day. If this coal contains as little as 3% sulfur, roughly 300 tons of sulfur dioxide gas is discharged through the stack. Upon hydration and atmospheric oxidation, this is converted to 450 tons per day of noxious sulfuric acid fumes. In addition, nitrogen oxides and unburned or partially-burned organic compounds in the flue gases add to the atmospheric pollution problem.

Numerous attempts have been made to alleviate the sulfur oxide pollution problem. See, for example, the review by Welty, "Flue Gas Desulfurization Technology", in Hydrocarbon Processing, October 1971, pages 104–108. The author comments on the confusion of "uncertain economics, a proliferation of unproven processes and compelling needs".

One suggested approach has been to introduce ammonia into the flue gas stream for reaction with sulfur dioxide and/or sulfur trioxide. Where electrostatic precipitators are employed to remove particulate matter at flue temperatures near the acid dew point (approximately 270°–280° F, where sulfuric acid begins to condense out), it is common to minimize precipitator corrosion by introducing upstream a small amount of ammonia sufficient to react with the sulfur trioxide. Also, in the Kezoura-T.I.T. process, where sulfur dioxide in flue gases is catalytically oxidized to sulfur trioxide, ammonia introduction is practiced at 220°–260° F and the resulting ammonium sulfate solids are separated and collected.

A modern process for treating flue gases containing sulfur dioxide but substantially no sulfur trioxide is described in my U.S. Pat. No. 3,579,296, issued May 18, 1971. There, ammonia is introduced at a temperature below about 220° F, and the resulting ammonium sulfites are separated and then decomposed by a cyclic reaction with an alkaline earth metal oxide or zinc oxide. However, the substantial advantages of that process, particularly in providing an easily agglomerated ammonium sulfite for near-stoichiometric removal of both the sulfite and the initial sulfur dioxide, are constrained by the requirement that the flue gas be cooled to below about 220° F. This requires more heat exchange capacity than is normally used in flue gas systems and, because of the low temperature and consequent reduction in gas buoyancy, may require a flue gas stack fan. Additionally, optimal effectiveness of that process requires prior removal of sulfur trioxide.

An object of the present invention is to provide a process for treating a flue or similar gas containing both sulfur dioxide and sulfur trioxide which does not require cooling of the gas stream to temperatures below 220° F or prior removal of the sulfur trioxide. A related object is to provide such a process which needs no additional heat exchange equipment or equipment for sulfur trioxide removal. Still another object is to provide a flue gas treatment process capable of a high degree of sulfur oxide removal and, in addition, a substantial reduction in nitrogen oxide, smog-producing organics content, and entrained particulate matter of the flue.

Another general object of the invention is to provide a flue gas treatment system which is readily integrated with conventional furnance equipment, and particularly with flue gas purification systems employing either high temperature (about 700°–800° F) or low temperature (about 260°–320° F) electrostatic precipitators. More particularly, this objective prevents corrosion of the latter precipitator, improves the efficiency of the low temperature precipitator, and permits the obtaining of maximum thermal efficiency of the flue gas system independent of any requirements of the sulfur oxide removal facilities. Thus, in general, the system of the invention aims to incorporate sulfur oxide and other contaminant removal with existing flue gas systems without interference with their normal construction and operation.

From a thermodynamic standpoint, an object of the invention is to remove sulfur oxides under conditions favoring the minimization of sulfur trioxide formation and favoring the production of a non-caking solid product, particularly in the low temperature precipitator.

Other and further objects, features, and advantages of the present invention will become apparent as the description thereof proceeds.

SUMMARY OF INVENTION

Briefly, the present invention is based in part on my discovery that while the maximum temperature is restriction in my previous Cann U.S. Pat. No. 3,579,296 patent has certain advantages, the introduction of ammonia into flue and similar effluent gas streams at substantially higher temperatures gives rise to unexpected benefits from the standpoints of improving sulfur oxide removal, improving the thermal efficiency of steam generation, increasing the efficiency of electrostatic precipitators, preventing corrosion, minimizing sulfur trioxide formation, and producing an ammonium salt of sulfur trioxide removal or for the installation of additional heat exchange capacity, unless additional heat recovery is required.

In substance, and in accordance with the invention, I treat an effluent gas containing minor but polluting amounts of both sulfur dioxide and sulfur trioxide, together with any nitrogen oxides and volatile organics, by contacting the gas with a comparatively large amount of ammonia at an elevated temperature. Ammonia reacts with the sulfur oxides to form bi-and mono- sulfates and sulfites which, at the elevated reaction temperatures and specified reaction conditions, are recoverable as non-caking salts.

In the preferred embodiment the ammonia is introduced in two stages, the first while the effluent gas is at a temperature between about 60° and about 1200° F and the second at a temperature within the range of about 220° to about 320° F, optimally above about 250° F. The amount employed in the first stage is at least sufficient to react with all the sulfur trioxide, and is desirably equivalent to from about 0.2 to about 1.8 mols of ammonia per mol of total sulfur oxide, while that employed in the second stage is such that the total of both ammonia introductions is equivalent to from about 1.8 to about 2.0 mols per mol of sulfur oxides.

In keeping with a further aspect of the described process, the recovered ammonium-sulfur oxide salts are treated with an alkaline earth metal oxide or with zinc oxide to liberate the ammonia for recycle and to form heat-decomposable alkaline earth metal or zinc salts of sulfur oxides. Drying, dehydrating, and thermally decomposing the salt under reducing conditions converts any hexavalent sulfur to tetravalent sulfur, and thereby liberates a stream of sulfur dioxide for separate recovery and a recycle stream of alkaline earth metal or zinc oxide.

According to an alternative embodiment, the ammonium salts of sulfur oxides are merely recovered and used as such for purposes to provide fertilizers and for paper pulping chemicals. This embodiment is particularly useful in smaller plants, especially where there is a market for ammonium sulfate or sulfite salts.

The invention will be more fully explained and exemplified in the ensuing specification, which is to be read in conjunction with the following drawing wherein:

DESCRIPTION OF DRAWING

The appended FIGURE is a schematic flow sheet, not drawn to scale, exemplifying a preferred embodiment of the inventive system.

DETAILED DESCRIPTION

Figure 1:
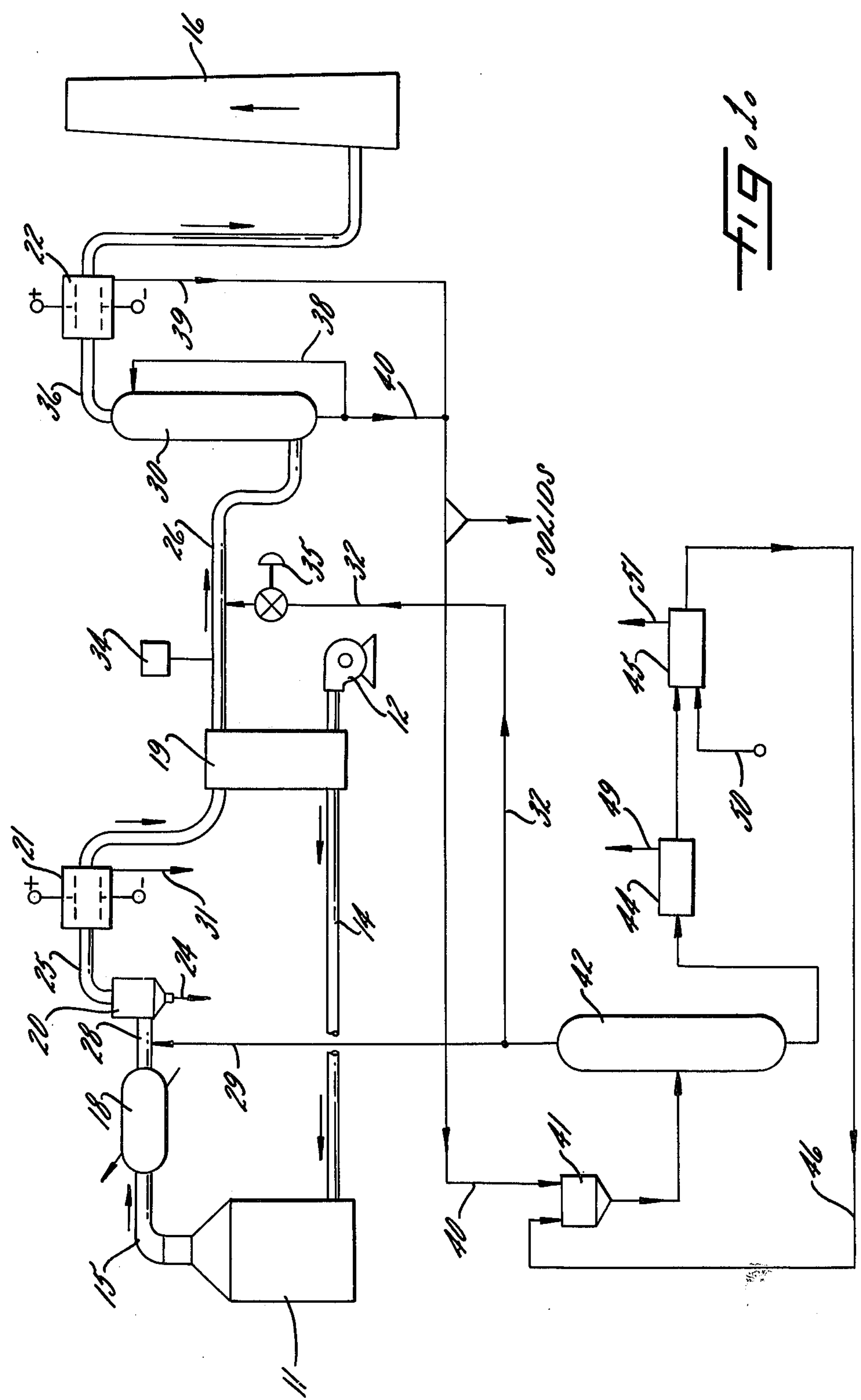

As noted, the preferred embodiment of the invention is depicted in the attached drawing. This is a simplified schematic flow sheet, and it will be appreciated that various utilities, pumps, gages, etc. have been omitted for reasons of clarity.

In brief over-view, the figure depicts a more-or-less typical furnace flue system embodying the principles of the invention. A furnace 11, supplied with a fossil fuel such as coal, oil, or natural gas, is supplied with combustion air from a blower 12 via a duct 14. Furnace or flue gases through the flue system 15 exit from the furnace 11 and ultimately via a stack 16. A similar flue system is employed for sulfurous ore roasting.

The flue system in a typical furnace includes an economizer or boiler 18 to recover a portion of the sensible heat discharged from the furnace 11, and an air preheater 19 where remaining heat in the flue gases is exchanged with the incoming air from the blower 12. Typical flue temperatures are about 700° to 800° F at the outlet of the economizer 18 and from about 250° F to about 320° F, more commonly from about 270° to about 320° F, at the outlet of the air preheater 19. An outlet flue temperature of greater than about 270° F is generally considered most desirable since, at these temperatures, the flue gas is sufficiently buoyant to ascend through the stack 16 without need for vacuum or draft fans. Temperatures in the class of 300°–320° F at the preheater 19 outlet are approximately the upper values for economical heat recovery, since substantially lower temperatures permit the recovery of more heat but at higher capital cost entailed in constructing larger preheaters 19.

The temperatures indicated above, it will be appreciated, are order-of-magnitude figures. In any particular furnace system the temperatures will necessarily be dictated by the nature of the fuel, fuel-air ratio in the furnace, air preheat temperature, heat recovery in the furnace 11 and economizer 18, and additional heat recovery in the air preheater 19. In as much as these recoveries are dependent on the the design and construction of the several units, as well as on the throughput capacity of the furnace 11, temperatures which are experienced in practice may vary considerably from the values indicated above.

To recover particulate solids from the flue gases, one or more mechanical separators 20 and one or more electrostatic precipitators 21, 22 may be employed. Mechanical separators of various types are described in Kirk-Othmer's "Encyclopedia of Chemical Technology", Second Edition, Volume 10, "gas cleaning", while electrostatic precipitators are described in Volume 8 of the same encyclopedia under "electrostatic precipitation". Mechanical separators usually depend on inertial effects to separate particulate solids from the flue gas stream, while electrostatic precipitators rely on imparting a charge to the solids and collecting the charged solids on an oppositely-charged set of collector plates.

As shown in the drawing, a mechanical separator 20, preferably of the cyclone type, is disposed down stream of the economizer 18 and receives flue gas at a temperature of about 600° to about 900° F, optimally about 700°–800° F. Entrained solids are discharged via a bottom conduit 24, while the remaining flue gases, containing a substantially reduced amount of solids, exit via a top duct 25.

Two general types of electrostatic precipitators are commonly in use, and either or both may be employed in a single gas system; the depicted embodiment schematically shows both, as precipitators 21, 22. The first type is the so-called temperature dry electrostatic precipitator, operating in the vicinity of about 700°–800° F, give or take 100°, while the low temperature dry electrostatic precipitator 20 typically operates in the range of about 270°–320° F. These remove dust particles too fine for recovery by the mechanical separators 20, and present a solid-free gas stream to the stack 16.

One of the major difficulties heretofore experienced with low temperature electrostatic precipitators such as precipitator 22 results from the "acid" dew point being reached. At approximately 270° to 280° F — a temperature frequently reached at the flue gas outlet of the air preheater 19 — sulfur trioxide and water vapor react and condense to form liquid sulfuric acid. The acid, it will be appreciated, is highly corrosive to the low-temperature portions of the preheater 19 as well as to the effluent duct 26, but, what is economically of extreme importance, to the expensive low temperature electrostatic precipitator 22. In all furnances employing high-sulfur (e.g., 0.3 weight percent or more) fuel the encountering of an acid dew point establishes a minimum temperature beyond which the economies of more heat removal by cooling to lower temperatures are more than counterbalanced by destruction of the duct work and the low temperature precipitators.

As noted earlier, various processes employing ammonia introduction have been proposed or used to simultaneously form an ammonium-sulfur oxide salt and to eliminate corrosive sulfur trioxide prior to reaching any temperature at or below the acid dew point. These however have generally entailed the addition of only sufficient ammonia to react with sulfur trioxide, or have involved the prior oxidation of sulfur dioxide to sulfur trioxide by catalysts which must be protected against excessive temperatures and the presence of solid fly ash or other dust particles.

In keeping with the invention, I employ a relatively large amount of ammonia to react with both the sulfur dioxide and the sulfur trioxide, and preferably introduce the ammonia initally while the flue or effluent gas is at a temperature above about 600° F. Since the proportion of sulfur dioxide to sulfur trioxide in a typical combustion gas is on the order of nine to one, I prefer the equivalent of from about 0.2 to about 2.0 mols of ammonia per mol of total sulfer or oxides in the effluent gas. This is more than sufficient to react with all of the sulfur trioxide, and is adequate to form predominantly the ammonium monosulfate, rather than the bisulfate. At the desirable ammonium-sulfur oxide salt recovery temperatures above about 220°F the resulting ammonium-sulfur oxide salts are non-caking and tend to be anhydrous, or only slightly hydrated. This relatively large amount of ammonia — approaching the stoichiometric — entirely eliminates the acid dew point and permits cooling of the flue gases in the preheater 19 to as low a temperature as is desired consistent with the economics of preheater size and the use or non-use of a stack fan to compensate for reduction in flue gas buoyancy.

One unusually important advantage of the present invention, in which sulfur oxides are reacted with ammonia at high temperature, is the minimization of the reaction of sulfur dioxide with oxygen in the flue gas to form sulfur trioxide. As brought out in the Welty article cited earlier, this reaction is extremely dependent on temperature. The equilibrium constant for the reaction $SO_2 + \frac{1}{2} O_2 = SO_3$ is approximately $10^6$ times as high at 100° C as it is at 400° C. Thus, by maintaining the temperature as high as possible when ammonia is added, conversion to the diffucuty-decomposable sulfates or trioxide is minimized. As a consequence, when desired to displace the ammonia by reaction with an alkaline material, the resulting salt contains only a minimal amount of alkaline sulfate, which would otherwise require elevated temperature or reducing conditions to thermally decompose to sulfur dioxide and the regenerated alkali.

Thus, according to this aspect of the invention, ammonia is introduced into the conduit 28 down stream of the economizer 18, via an ammonia introduction conduit 29. The reaction of ammonia with sulfur oxides is at least sufficient to convert all of the sulfur trioxide to ammonium monosulfate, with virtually no detectable caking occasioned by the presence of ammonium bisulfate. Additionally, and depending on the factors set forth earlier, the amount of ammonia is sufficient to react with a substantial amount of the sulfur dioxide in the effluent gas to form ammonium sulfites, predominantly the bi-sulfite.

These various ammonium-sulfur oxide salts are formed almost instantaneously, and exist as finely divided smoke-like solids. They are thus readily removable in either a low temperature electrostatic precipitator 22, or a collecting tower 30, to be described presently.

Where the flue system contains a mechanical separator 20, a large proportion of the fly ash particles are removed by the separator 20 and withdrawn via a conduit 24.

Where the flue system contains a high temperature — 600°–900° F — precipitator 21, solids escaping the mechanical separator 20 are largely removed by the precipitator 21, and withdrawn via a conduit 31.

The now-substantially-solid-free flue gases exiting from the high temperature precipitator 21 are then conducted to an air preheater 19, where the flue gases exchange heat with incoming air supplied via the conduit 14 and the blower 12. The exit temperature of flue gases from the preheater 19, at the conduit 26, is normally in the range of about 250° to about 320° F, although the temperature may be lower under particular circumstances, as for example when a draft fan is included in the stack 16. A temperature of at least about 220° F is, however, essential for practicing the process of the invention, since at above 220° F the ammonium-sulfur oxide solids are non-caking. Ordinarily, the temperature at the outlet of the preheater 19 will be above about 270° F to avoid need for a stack fan, and preferably within the range of about 300° to about 320° F.

For maximum sulfur oxides removal, it is desirable to supplement the orginal ammonia introduction into the conduit 28 by a second ammonia introduction step downstream, or even in the lower temperature regions of, the preheater 19. To this end, a second ammonia introduction conduit 32 is included to admit gaseous ammonia into the flue gas effluent duct 26. The amount of ammonia introduced via the conduit 32 is sufficient to react with all the remaining sulfur oxide until the desired degree of sulfur oxide removal is attained, but in no event is greater than about 2.0 mols of ammonia per total mols of initial sulfur oxides in the flue gas, i.e., the stoichiometric reaction to form monosulfites and monosulfates.

Where two stage ammonia introduction is practiced, it is preferable that the amount of ammonia introduced into the first stage be from about 0.2 to about 0.8 mols of ammonia per mol of sulfur oxide, and that the second stage introduce sufficient additional ammonia such that the total of both ammonia introductions is equivalent to from about 0.8 to about 2.0 mols of ammonia per mol of sulfur oxide. These proportions insure at least about 90% of sulfur oxide removal, and theoretically up to 100%. Further, the sulfur oxides (particularly sulfur trioxide) are recovered as an ammonium salt of the mono-sulfur oxide, rather than the bi-sulfur oxide. By this two-stage technique, formation of ammonium bisulfate is almost completely avoided.

Both for anti-pollution and for economic reasons, it is desirable to employ automatic control of the second ammonia injection. To this end, a continuous automatic sulfur dioxide analyzer 34 is connected downstream of the precipitator 21 and, to minimize time lags, preferably downstream of the preheater 19. The analyser 34 controls a valve 35 which increases or decreases, as the case may be, the amount of ammonia addition as the sulfur dioxide content of the flue gas increases or decreases, respectively. Thus, it is possible to adjust the control system to maintain continuously a preselected sulfur dioxide content by introducing sufficient ammonia to react with all sulfur oxides above that predetermined limit. This procedure has the additional advantage in that it accomodates widely varying sulfur contents of the fuel supplied to the furnance 11.

Because of the fine smoke-like nature of the ammonium-sulfur oxide salts, under some circumstances — particularly where stringent sulfur oxide limits are imposed — a liquid collector 30 may be disposed in the duct 26, either upstream of downstream of a low temperature electrostatic precipitator 22. If, as shown in the drawing, it is positioned upstream, gases entering from the duct 26 ascend through the tower 30 and exhaust near the top via a duct 36, where they are then transmitted to the low temperature precipitator 22 and thence out the stack 16.

The collector 30 is a conventional packed tower, loosely filled with cylinders, saddles, gridwork, wire mesh, or the like to afford high surface area contact between the ascending flue gases and a descending stream of liquid. This liquid, circulated through a conduit 38 from the bottom of the tower 30 to a point near its top, distributes itself over the tower packing and permits the gas to contact the film of liquid.

For the collecting, it is preferred to employ an aqueous solution of ammonium salts of sulfur oxides. Since the solubility of ammonium sulfites is so extremely high, the salts build up in concentration to a point where the boiling point of the scrubbing liquid is well in excess of the normal boiling point of water, viz. 212° F. Thus, flue gas temperatures of greater than 270° F, and even up to the 300°–320° F level, may be accomodated after the ammonium-sulfur oxide salts concentration in the recycling liquid builds up.

The collecting tower 30 also provides other functions and, for these alone, is beneficially used. Particulates, to the extent they have not been occluded on the sulfur oxides previously removed in the system, are collected by the stream of ammonium-sulfur oxide solution, as is any remaining smog-forming organic material.

The flue gas effluent from the scrubber tower 30 passes through a duct 36 to an optional low temperature electrostatic precipitator 22, from which the solids are removed via a conduit 39 while the fully treated flue gases are sent to the stack 16.

The exemplary system described above produces one stream of ammonium-sulfur oxide solids, and one of a strong aqueous solution of ammonium-sulfur oxides. Solids are produced via the conduit 39 from the low temperature precipitator 22. Liquid is obtained as excess recycle around the collecting tower 30, and may be withdrawn at conduit 40. Although each or any of these streams may be omitted in a particular installation, depending upon the requisite degree of pollution and solids removal, four such streams are indicated merely by way of example.

These various ammonium-sulfur oxide salt streams may either be used as such or may be processed for recovery and reuse of the ammonia and for either recovery or conversion of the sulfur dioxide (or trioxide) component. Ammonium sulfate, and to a lesser extent ammonium sulfite, is valued as a fertilizer, etc., and both the sulfate and sulfite are necessary constituents of various types of wood pulping processes. Should pulp mills be located economically close to the flue gas treatment system, it is frequently justifiable to dispose of the ammonium-sulfur oxide salts to the mills.

Where, however, there is an insufficient market for the ammonium-sulfur oxides, these may be treated in a cyclic process with an alkaline earth metal oxide or with zinc oxide to liberate ammonia for recycle and to form the corresponding metal oxide-sulfur oxide salts. These latter salts are dried, dehydrated, and thermally decomposed to form sulfur oxide and an alkaline earth metal or zinc oxide for recycle. Preferably, as will be described, the thermal decomposition occurs under reducing conditions so that the sulfur is reduced from the hexavalent ($SO_3$) to the tetravalent ($SO_2$) form.

Turning again to the drawing, there is depicted, in generalized schematic form, a system for effecting the recovery of ammonia in a cyclic process involving an alkaline earth metal oxide or zinc oxide. Details of an illustrative system of this type are described in my previous patent, U.S. Pat. No. 3,579,296, referred to earlier.

Briefly, the concentrated ammonium-sulfur oxide salt solution — predominantly ammonium bi-sulfate — conducted via line 40 is received in a slurry storage tank 41 in the ammonia recovery section shown at the bottom of the drawing. There it is mixed with recycled metal oxide, or slaked metal oxide (e.g., magnesium, calcium, barium, strontium, or zinc) in an amount sufficient to liberate ammonia, to form insoluble metal sulfite, and to form soluble metal sulfate. One mol of metal oxide is required per mol of ammonium monosulfate or bisulfate should any be present. Additionally, metal oxide is added sufficient to react with the solid ammonium-sulfur oxide salts admitted to the slurry tank 41 via conduit 39.

From the closed slurry tank 41 the entire mixture is passed to a still 42, where under the influence of heat the ammonia formed by the reactions in the tank 41 is distilled overhead via conduit 29. Additional ammonia as makeup may be added via conduit 47 before readmission into the flue duct 28.

The still bottoms from still 42 are conducted via a conduit 48 to a dryer 44 where water is removed via vent line 49 and optionally passed to the stack 16.

The dried solids are then transferred to a reduction-decomposition furnace 45. There, a reducing gas stream such as water gas, hydrogen, ammonia, or natural gas, is admitted via a conduit 50 to effect reduction of sulfate salts to sulfites, and sulfur trioxide to sulfur dioxide. At a temperature of about 1800° F (typically within the range of about 400°–1100° C) both reactions occur; viz., the reductions and the decomposition of the metal-sulfur salts to free sulfur dioxide and metal oxide for recycle. The gaseous product, withdrawn through a conduit 51, consists of sulfur dioxide along with constituents of the reducing gas stream, and is sufficiently concentrated in sulfur dioxide for direct condensation and recovery of the $SO_2$.

Alternatively, reduction in the heater 45 may be conducted at an even higher temperature, in which event the sulfur dioxide is reduced to free sulfur. In this case the products passing through conduit 51 are predominantly vaporized elemental sulfur, which is readily condensed on cool-surfaced exchangers.

The solid product from the heater 45 consists of metal oxide. This is cycled via conduit 46 back to the slurry tank 41 for re-use in the ammonia recovery process.

Thus it is apparent that there has been provided, according to the invention, an outstanding, yet outstandingly simple, system for treating flue gases containing sulfur dioxide and sulfur trioxide for the efficient removal of these contaminants. The inventive process is readily integrated with existing equipment and processes, and permits of almost complete elimination of these pollutants.

I claim as my invention:

1. In a method of treating an effluent gas containing a minor but polluting amount of both sulfur dioxide and sulfur trioxide by contacting said effluent gas with ammonia to form an ammonium salt of a sulfur oxide, the improvement comprising:

introducing said ammonia in gaseous form while said effluent gas is at a temperature above about 220° F and below about 1200° F, and in an amount at least sufficient to react with all the sulfur trioxide but not more than that equivalent to about 2.0 mols of ammonia per mol of total sulfur oxides in said effluent gas to thereby convert substantially all of the sulfur trioxide to ammonium monosulfate and to convert sulfur dioxide predominantly to the bi-sulfite, under temperature conditions minimizing oxidation of sulfur dioxide to trioxide, wherein said ammonium salts include salts of both sulfur dioxide and sulfur trioxide, recovering the resulting non-caking solid ammonium salts of sulfur oxides from said effluent gas at a temperature above about 220° F, treating said salts with at least the stoichiometric amount of an aqueous member of the group consisting of alkaline earth metal oxide and zinc oxide to liberate ammonia for recycle and to form alkaline earth metal or zinc sulfur oxide salts, and drying, dehydrating, and thermally decomposing said salts under reducing conditions to convert the sulfur from hexavalent to tetravalent sulfur oxide and thereby liberate a stream of sulfur dioxide and to recover alkaline earth metal oxide or zinc oxide for recycle.

* * * * *